P. H. GUNDERMANN.
FUEL VALVE.
APPLICATION FILED MAR. 3, 1921.
1,418,073.
Patented May 30, 1922.
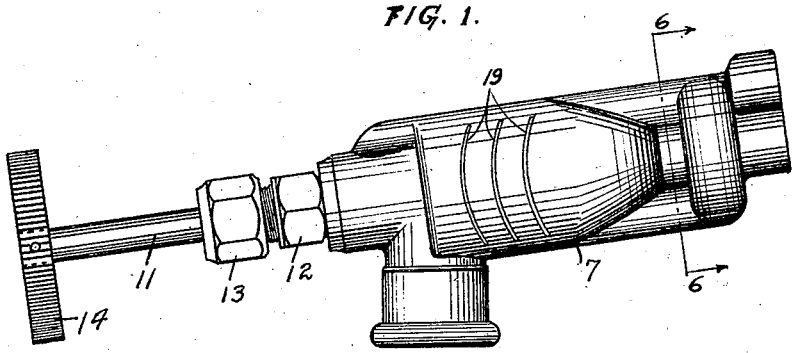
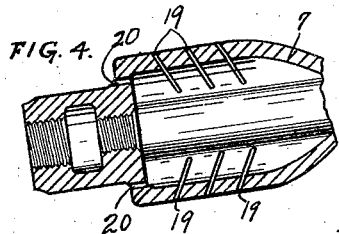
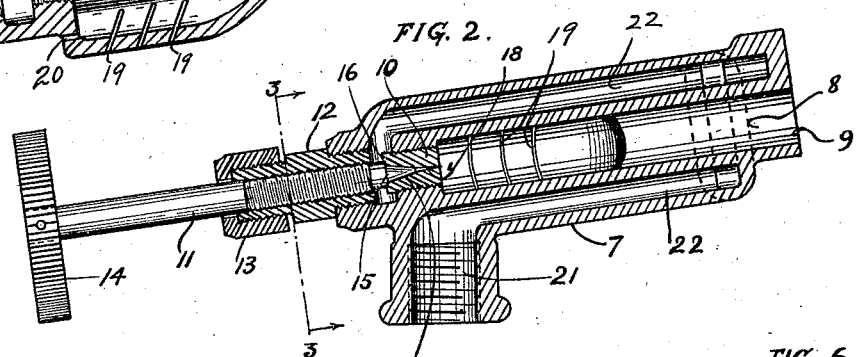
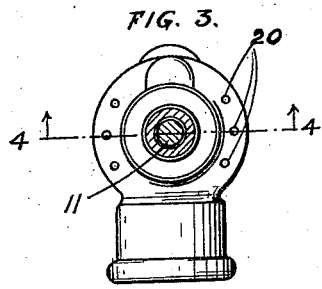
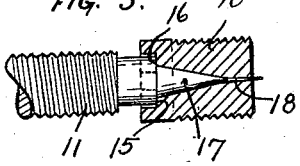
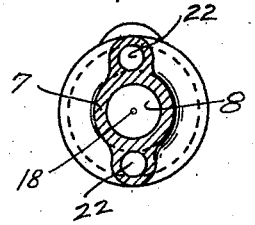
WITNESS: Julius A. Klostermann.
PHILIP H. GUNDERMANN, INVENTOR.
BY
Nissen & Crane
ATTORNEY.

UNITED STATES PATENT OFFICE.

PHILIP H. GUNDERMANN, OF CHICAGO, ILLINOIS.

FUEL VALVE.

1,418,073.          Specification of Letters Patent.        Patented May 30, 1922.

Application filed March 3, 1921. Serial No. 449,556.

*To all whom it may concern:*

Be it known that I, PHILIP H. GUNDERMANN, a citizen of the United States, residing at Chicago, in the county of Cook and State of Illinois, have invented certain new and useful Improvements in Fuel Valves, of which the following is a specification.

My invention relates to fuel valves and has for one of its objects the provision of a simple and efficient device of this character which will not be subject to currents of air and which will operate in cold temperatures.

A further object is the provision of a valve seat and valve having engaging surfaces adapted to make a fluid-tight joint which are disposed at right angles to the axis of the valve.

A further object is the provision of a valve seat and cooperating valve having a tapering passage therethrough and fluid-tight forming surfaces disposed at right angles to the valve.

Other objects will appear hereinafter.

An embodiment of my invention is illustrated in the accompanying drawing, forming a part of this specification, and in which—

Fig. 1 is a side view of a valve embodying my invention;

Fig. 2 is a longitudinal section of the same;

Fig. 3 is a view taken on line 3—3 of Fig. 2;

Fig. 4 is a section taken on line 4—4 of Fig. 3;

Fig. 5 is an enlarged fragmental section showing the valve and seat in my improved construction; and Fig. 6 is a section taken on line 6—6 of Fig. 1.

Referring more particularly to the drawing, I have indicated a casing 7 formed of a single casting. It will be apparent that this casing may be made in more than one part and formed in any desirable manner, but I prefer to form it of a single casting so that there will be no joints to open up in use due to contraction and expansion and oxidation.

In the casing 7 I provide a combustion passage 8 open at 9 to the outside atmosphere. At the other end of the passage is a removable valve seat member 10 which may be formed so as to be removable, as indicated in Fig. 2. This valve seat has its opening at substantially the axis of passage 8 so that fuel issuing from said opening will be driven towards opening 9. In the casing 7 I mount a valve stem 11, which in the present instance is mounted in a removable fitting 12 and provided with a stuffing box 13 of any preferred design. The valve stem 11 has a wheel 14 for manipulating it. At the inner end of the valve stem 11 is a valve seat 15 having its valve seat engaging surface at substantially right angles to the axis of the stem. The portion 15 engages a valve seat 16 in member 10 which is substantially parallel to seat 15. With this construction, when the valve stem 11 is turned to close the valve, the flat surfaces 15 and 16 will be brought together and will not be distorted by the heat of the valve in use or materially injured by oxidation due to the heat in use.

From the part 15 of the valve I provide a tapering portion 17 substantially fitting a corresponding opening in the seat member 10. At the end of the taper portion 17 I provide another taper portion 18 which is formed with less taper than the portion 17, but is of sufficient taper to insure having the greatest velocity of fuel at the edge of the opening where the latter opens into passage 8. This insures a more thorough mixture of air with the fuel than where the smallest part of the fuel opening is back further than at this point.

In the sides of the casing 7 I provide a plurality of slots 19 which are preferably disposed at an acute angle to the axis of passage 8 and preferably extending generally toward opening 9 so as to give the air the general direction of opening 9 upon entering chamber 8. Also, a plurality of openings 20 may be provided extending substantially parallel to the axis of passage 8 for the introduction of air into said chamber. The openings 20 and slots 19 are sufficient to give the fuel the required amount of air for producing the "Bunsen" flame.

Fuel enters the casing 7 through an opening 21 at the bottom thereof and a passage 22 extends along under passage 8 to a point near opening 9 and thence divides and passes around both sides of passage 8 and back along the upper side of said passage 8 to the valve seat 16 so that when the valve is open the fuel can pass through the opening in member 10 to chamber 8. This arrangement carries the fuel around the hot walls of the chamber 8, thereby bringing the fuel to a very high degree of heat ready to be easily vaporized when passed through the needle valve.

It will be apparent that the needle-like portion 18 will keep the fuel opening clean, and also since it fits snugly in its portion of the opening of member 10, will effectively prevent the fuel from leaking when the device is not in use.

I claim:—

1. A fuel valve comprising an integral body having a central combustion passage and portions of a fuel passage disposed above and below the combustion passage and connected with one another by passages extending across said combustion passage on opposite sides and adjacent to the forward open end thereof, pockets communicating with the rear end of said combustion passage and having openings in the walls thereof for admitting air to said combustion passage, a valve seat removably disposed in a wall of the casing between said passages and connected with both of said passages, and a valve extending through the fuel passage and cooperating with said seat.

2. A fuel valve comprising a casing having a combustion passage, portions of a fuel passage above and below the combustion passage, the walls of said combustion passage being extended between the upper and lower portions of said fuel passage to form pockets communicating with said combustion passage, and slots through said walls for admitting air into said pockets.

3. In combination, a casing having a combustion chamber, a fuel passage in said casing adjacent said chamber, a valve seat having an opening therein connecting said passage with said chamber, said valve seat comprising a plug removably secured in said casing, a valve for closing the opening in said seat and provided with a stem extending through said casing, and removable means for supporting said stem in said casing, said supporting means being arranged when removed to provide an opening in said casing through which said valve seat plug may be removed.

In testimony whereof I have signed my name to this specification on this 21st day of February, A. D. 1921.

PHILIP H. GUNDERMANN.